(12) United States Patent
Johnston et al.

(10) Patent No.: US 8,526,702 B2
(45) Date of Patent: Sep. 3, 2013

(54) 4D ANATOMICALLY BASED IMAGE SELECTION PROCEDURE FOR MEDICAL IMAGING

(75) Inventors: Eric Johnston, Palo Alto, CA (US); Peter G. Maxim, Palo Alto, CA (US); Billy W. Loo, Jr., Foster City, CA (US); Maximilian Diehn, Foster City, CA (US)

(73) Assignee: The Board of Trustees of the Leland Standford Junior University, Palo Alto, CA (US)

( * ) Notice: Subject to any disclaimer, the term of this patent is extended or adjusted under 35 U.S.C. 154(b) by 93 days.

(21) Appl. No.: 13/345,374

(22) Filed: Jan. 6, 2012

(65) Prior Publication Data

US 2012/0177271 A1    Jul. 12, 2012

Related U.S. Application Data

(60) Provisional application No. 61/460,695, filed on Jan. 6, 2011.

(51) Int. Cl.
*G06K 9/00*    (2006.01)

(52) U.S. Cl.
USPC ............................. 382/131; 382/132; 382/128

(58) Field of Classification Search
USPC .......................................... 382/128, 131, 132
See application file for complete search history.

(56) References Cited

U.S. PATENT DOCUMENTS

| | | | |
|---|---|---|---|
| 7,835,493 B2* | 11/2010 | Keall et al. | 378/65 |
| 7,894,571 B2 | 2/2011 | Keall et al. | |
| 7,907,990 B2* | 3/2011 | Ferenczi et al. | 600/427 |
| 8,131,044 B2* | 3/2012 | Wollenweber et al. | 382/131 |
| 8,340,247 B2* | 12/2012 | Keall et al. | 378/69 |
| 2007/0286331 A1 | 12/2007 | Keall et al. | |
| 2008/0281192 A1 | 11/2008 | Keall et al. | |
| 2009/0116719 A1 | 5/2009 | Jaffray et al. | |
| 2011/0009761 A1 | 1/2011 | Ruan et al. | |
| 2011/0116695 A1 | 5/2011 | Wollenweber et al. | |

OTHER PUBLICATIONS

Lu et al., "A comparison between amplitude sorting and phase-angle sorting using external respiratory measurement for 4D CT", 2006, pp. 2964-2974, Medical Physics v33n8.
Rietzel et al., "Improved retrospective sorting of 4D computed tomography data", 2006, pp. 377-379, Medical Physics v33n2.

* cited by examiner

*Primary Examiner* — Tom Y Lu
(74) *Attorney, Agent, or Firm* — Lumen Patent Firm

(57) ABSTRACT

Improved 4D imaging reconstruction is provided for a freely breathing patient. 3D patient images from an imaging dataset are binned according to respiratory displacement or phase. The bins are defined by ranges, so every image in the raw 3D data set is included in a bin. Since binning in this manner often results in two or more images per bin, the 4D reconstruction is determined by selecting one 3D image from each bin at each patient position. This selection is performed so as to maximize the anatomical similarity of 3D images at adjacent patient positions. In cases where the 3D images include multiple slices, a 2D comparison of the closest slices can be used to determine anatomical similarity of the 3D images.

8 Claims, 5 Drawing Sheets

4D ANATOMICALLY BASED IMAGE SELECTION PROCEDURE FOR MEDICAL IMAGING

CROSS REFERENCE TO RELATED APPLICATIONS

This application claims the benefit of U.S. provisional patent application 61/460,695, filed on Jan. 6, 2011, entitled "4D Computed Tomography Anatomically Based Image Selection Procedure", and hereby incorporated by reference in its entirety.

FIELD OF THE INVENTION

This invention relates to 4-D imaging.

BACKGROUND

In medical imaging, it is often desirable to perform 3D imaging over a period of time to provide what is often referred to as 4D imaging. In 4D imaging, it is usually the case that imaging is performed at different patient positions (often referred to as "couch positions") at different times. In such cases, the raw imaging data is a set of 3D images having time stamps, and the problem arises of how best to use this raw data to provide 4D imaging results. In particular, patient motion can cause considerable difficulty for 4D reconstruction.

An important special case of patient motion is breathing. For example, four dimensional (4D) computed tomography (CT) imaging is an important tool in radiation oncology. It enables tighter margins to be used during treatment planning and enhances accuracy during treatment delivery for patients with tumor motion affected by respiration. Since respiration is basically periodic, respiratory displacement or phase values can be associated with each 3D image, to facilitate reconstruction. If breathing is the dominant patient motion, then images at or near the same point in the respiratory cycle should have comparable feature locations, thereby facilitating 4D reconstruction.

Some conventional 4D reconstruction approaches are based on this observation. More specifically, 3D images can be sorted into a predefined number of bins. The most common method to acquire a 4D CT scan of a patient is to use the CT scanner in cine-mode. The time stamps of the reconstructed CT images and the measured respiratory signal of the patient are retrospectively matched. The reconstructed images are then sorted either by the phase (phase based sorting) or the displacement (displacement based sorting) of the respiratory signal into image bins, which are then stacked to create a three dimensional (3D) image of the patient for each image bin. A 4D dataset is then reconstructed by viewing the 3D images in sequence for each image bin.

More specifically, conventional procedures generate a 4D CT data set by assembling CT images using the nearest-neighbor (NN) approach, i.e. the image whose phase or displacement is numerically closest to the desired image bin value is added to that bin. Because of mismatches in the phase or displacement between adjacent couch positions, artifacts in the images will be created. These artifacts appear as discontinuities at the interface between adjacent bed positions in the 4D CT images and cause systematic errors in patient contouring and dose calculations. The prevalence of artifacts is high. In one published report, at least one artifact appeared in retrospectively phase sorted 4D CT images for 45 out of 50 patients.

It would be an advance in the art to provide improved 4D image reconstruction of 3D images of a freely breathing patient.

SUMMARY

To better appreciate the present approach, it is helpful to consider a typical raw data set of 3D images in greater detail. At each patient position, 3D imaging is performed over a period of time including one or more full respiration cycles. Once all the data is taken at one patient position, the patient is moved and 3D data is gathered at the new patient position. This process is repeated at each patient position. A respiration value (e.g., displacement or phase) is determined for each of the 3D images. As indicated above, the main problem in 4D reconstruction is how best to avoid introducing artifacts at the boundaries between adjacent patient positions.

The basis of the above-described nearest neighbor approach is now apparent. If images at adjacent couch positions also have the same (or nearly the same) respiratory phase/displacement, then artifacts in reconstruction are less likely. Thus, the NN approach assembles a complete 3D image for each of the phase/displacement bins, and the resulting data set is the 4D reconstruction.

It is important to note that much raw data can be lost in this process. For example, the NN approach assigns exactly one image to each bin for each couch position. Raw 3D images having phase or displacement values that are not a nearest neighbor of one of the predefined image bin values are a priori excluded from the reconstruction.

The present approach makes more systematic use of the raw 3D data. In particular, bins are defined by non-overlapping bin ranges that cover the full range of respiration values (e.g., either phase or displacement). All of the raw 3D images are binned according to these bin ranges, which results in at least one image bin including two or more of the raw 3D images for at least one of the patient positions. Typically, image bins will include several 3D images.

With this binning approach, all of the raw 3D data is included at the binning stage of the process. A 4D reconstruction is specified by selecting one 3D image from each of the bins at each of the patient positions. This selection of 3D images is performed according to anatomical similarity between 3D images at adjacent patient positions. For example, suppose there are 4 couch positions: P1, P2, P3, P4. Images at P1 would be compared to images at P2, because P1 is adjacent to P2. Similarly, images at P2 would be compared to images at P3, because P2 is adjacent to P3. In practice, the 3D images are often provided as a set of slices (see FIG. 2, described in greater detail below). In such cases, anatomical similarly of 3D images is determined from the similarity of their closest slices. If each of the images in the preceding example has 3 slices, then slice 3 of P1 is compared to slice 1 of P2, slice 3 of P2 is compared with slice 1 of P3, etc.

Generally, images are selected such that the anatomical similarity between images at adjacent patient positions is maximized. Thus, it is convenient to refer to the present approach as using anatomically optimized (AO) image selection rather than NN image selection. Practice of the invention does not depend critically on the details of this optimization. In one embodiment, comparing the closest slices of the 3D images at adjacent patient positions is performed by computing a two dimensional spatial correlation coefficient $K(i,j,n)$ of the closest slices, where 3D images at patient position n are indexed with an integer i, and 3D images at patient position n+1 are indexed with an integer j. A pair cost $1/K(i,j,n)$ can be defined for each pair of 3D images at adjacent patient positions, and the 3D images at each patient position can be selected to minimize the total pair cost from an initial patient position to a final patient position. As indicated above, various optimization strategies and/or cost functions can be employed, provided that similarity of images at adjacent patient positions is maximized.

Practice of the invention also does not depend critically on details of how the bin ranges are defined. In one embodiment, a predetermined set of respiration values (Vi) is provided. For each of the predefined values Vi, a nearest neighbor image is determined, and its corresponding respiration value is Ni. Finally, bin range boundaries are determined by averaging adjacent image respiration values Ni. For example, the boundary between the bins including N1 and N2 is at (N1+N2)/2. Similarly, the boundary between the bins including N2 and N3 is at (N2+N3)/2. FIGS. 1a-b provide examples of this binning approach. An advantage of this binning approach is that it guarantees at least one image in each bin, which would not be the case for predetermined bin ranges.

The present approach is broadly applicable to any kind of medical imaging, including but not limited to: computed tomography, X-ray imaging, magnetic resonance imaging and positron emission tomography. As demonstrated below, the use of anatomical similarity in 4D reconstruction advantageously reduces reconstruction artifacts.

DETAILED DESCRIPTION

Figure 1A:
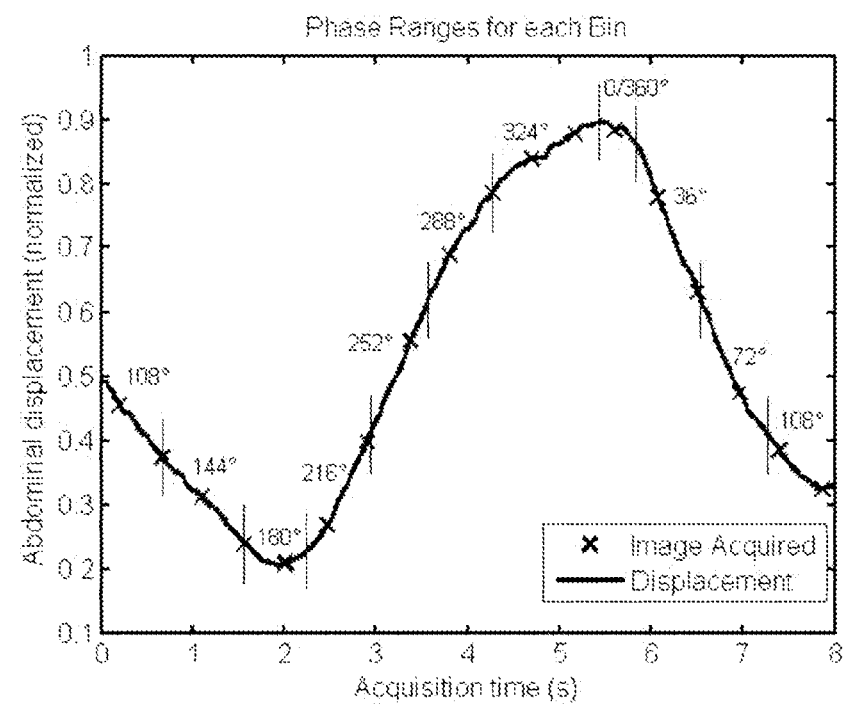
FIG. 1a shows a breathing trace with phase bins delimited by vertical lines.

In this section, an experimental demonstration of the above-described principles in connection with 4D computed tomography (CT) is described.

A) Methods

A1) Data Acquisition

The 4D CT scans were performed on the GE Discovery ST multislice PET/CT scanner (General Electric Medical Systems, Waukesha, Wis.) in cine mode. During the CT scan, patient respiratory traces were acquired using the Real-Time Position Management system (RPM, Varian Medical Systems, Palo Alto, Calif.), with the external marker placed on the upper abdomen. The data were acquired at each bed position for a cine duration that was set to 1 second longer than the average observed respiratory period for each patient. Scan parameters were set as follows: 0.5 s gantry rotation, 0.45 s cine interval, and 2.5 mm slice thickness. Each image reconstruction took 360° of projection data.

A2) Patient Population

This retrospective study was conducted with the approval of the institutional review board. Ten consecutive patients with lung cancers that received radiation therapy at our institution were analyzed in the context of this study. Seven patients could have potential respiratory compromise due to either chronic obstructive pulmonary disease (COPD) or prior lobectomy.

A3) Displacement and Phase Assignment

Every acquired image is assigned both a phase and a displacement vector based on the respiratory trace generated by the RPM tracking system. Since the phase and displacement each require identification of peaks and valleys in a patient's respiratory trace, we developed an in house program that allows the manual identification of peak inhalation points. Maximum exhalation is then defined as the lowest point between two peaks. Next, the phase of each image was found following the method described by Lu et al. Briefly, the time of the first peak $t_1$, first valley $t_2$, and the following peak $t_3$, are set to the phases 0°, 180°, and 360° respectively. Let $t_{image}$ be the time at which an image was created, which is the average of the start and end times of one 360° gantry rotation. Then the corresponding phase $\rho$ is given by $$\rho = \frac{t_{image} - t_1}{t_2 - t_1} \times 180° \quad t_1 < t_{image} < t_2, \quad (1)$$

$$\rho = \frac{t_{image} - t_2}{t_3 - t_2} \times 180° + 180° \quad t_2 < t_{image} < t_3.$$

Each image is also assigned an amplitude and direction of breathing which is normalized such that the maximum inhalation (highest peak) amplitude of the entire respiratory trace is set to one and the maximum exhalation (lowest trough) is set to zero. The displacement of each image is thus a value on the interval [0, 1] along with a direction of exhale or inhale.

A4) Displacement and Phase Binning

We sorted the images in four different ways: phase and displacement sorting using NN image selection, and phase and displacement sorting combined with AO image selection. All sorting methods begin with the same process: we designated ten bins for both displacement and phase based sorting resulting in a 4D CT dataset comprising ten complete 3D CT images (sorting data into 10 bins is our institutional standard). With displacement based sorting, these bins are labeled as {1 maximum inhale, 0.8 exhale, 0.6 exhale, 0.4 exhale, 0.2 exhale, 0 maximum exhale, 0.2 inhale 0.4 inhale, 0.6 inhale, 0.8 inhale}. Each bin is filled with the image whose assigned displacement is numerically closest to that bin (NN approach). Phase based sorting uses a similar method: each bin is filled with the image whose assigned phase is closest to that bin (phase based sorting bins are labeled {0°/360°, 36°, 72°, 108°, 144°, 180°, 216°, 252°, 288°, 324°}). The NN selection approach allows for exactly one image in each bin, but the same image can be used in more than one bin if it is numerically closest to two different bins. Our new selection and sorting procedure differs from NN selection in that it allows several candidate images to be sorted into a given image bin. Among these candidate images a single image from each is selected based on its similarity to images at the adjacent couch positions (AO approach).

A5) Anatomically Optimized Selection

The images are initially sorted using the NN displacement and phase binning described above—with one image assigned to each bin. More images are then added to each bin by selecting the images whose phases or displacements are within a certain range of the desired image bin value. This range can be determined as follows: The average displacement or phase between two NN images forms a boundary between two image bins. Two boundaries therefore form the range of an image bin for one specific value. The result of these ranges is that each image bin will have at least one image but will often have more.

Figure 1B:
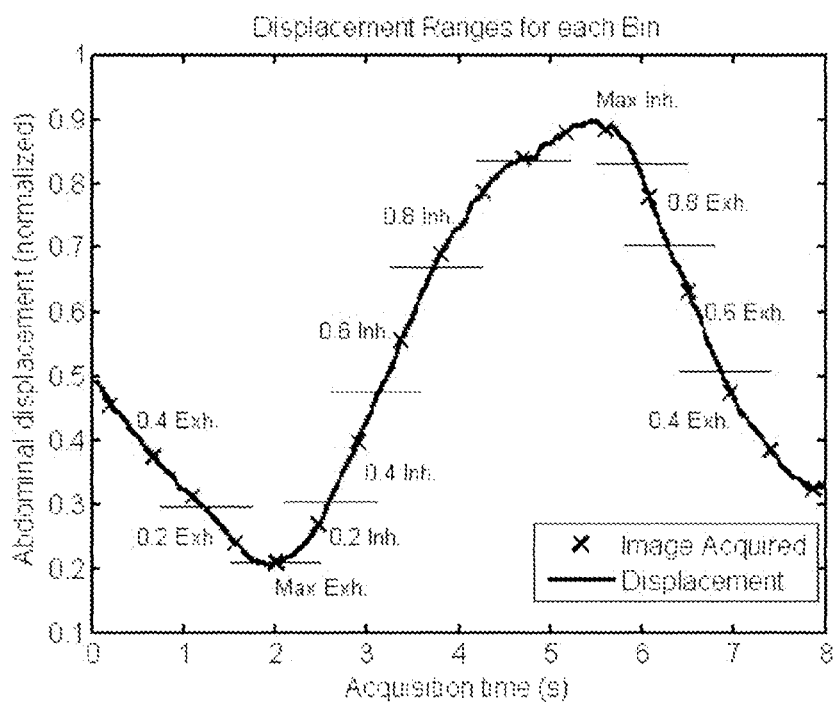
FIG. 1b shows a breathing trace with displacement bins delimited by horizontal lines.

FIGS. 1a-b show images acquired during one acquisition cycle along with the image bins each image was assigned to. On FIG. 1a, vertical lines delimit the boundaries between each phase bin. Every image within these limits is added to the corresponding phase bin. On FIG. 1b, horizontal lines delimit the displacement boundaries. Images within the boundaries of a displacement bin are added to it.

Importantly, each image can only be assigned to one bin. This requirement ensures that there is no "convergence" of images in different image bins to the same point in the respiratory pattern. The entire range of respiratory motion is still captured.

Each image bin therefore has a number of possible combinations of images to form a complete 3D CT image. The best images are then found by comparing the similarity of all slices bordering couch transitions. In order to describe the AO selection we use the same nomenclature for defining a slice as developed by Carnes et al., i.e. each indexed slice is represented by $$I(n,p)_t = I(x,y) \forall x,y \in [1,512]; n \in [1,N]; p \in [1,P]; t \in [1,T]; \quad (2)$$

where n is the current couch position, p is the indexed slice within each couch position, and t is number of the current slice acquisition taken at one couch position (for an integer total of T acquisitions per couch position).

The best images in each bin are found by treating each set of T images as a node in a graph with arcs connecting all $I(n, P)_t$ to $I(n+1, 1)_t$ within each image bin. Each arc has a cost equal to 1/K where K is the two dimensional correlation coefficient between I(n, P) and I(n+1, 1). The correlation coefficient K is defined as $$K = \frac{\sum_{x,y}[I_A(x,y) - \bar{I}_A][I_B(x,y) - \bar{I}_B]}{\sqrt{\sum_{x,y}[I_A(x,y) - \bar{I}_A]^2[I_B(x,y) - \bar{I}_B]^2}} \quad (3)$$

where $I_A$ and $I_B$ are two images and $\bar{I}_A$ and $\bar{I}_B$ are the average pixel values of each image. The correlation coefficient is used because adjacent slices with a higher degree of similarity will intuitively have fewer artifacts. Likewise, slices with a low degree of similarity probably come from two different points in the breathing cycle.

After all images are assigned to their respective bins, Dijkstra's algorithm is applied in order to find the shortest path from couch position 1 to N. Briefly, Dijkstra's algorithm is a greedy algorithm for finding the least cost path between two nodes in a graph. The shortest path between couch position 1 and N is considered the optimal path. The best sets of P images are those whose nodes are used in the optimal path.

Figure 2:
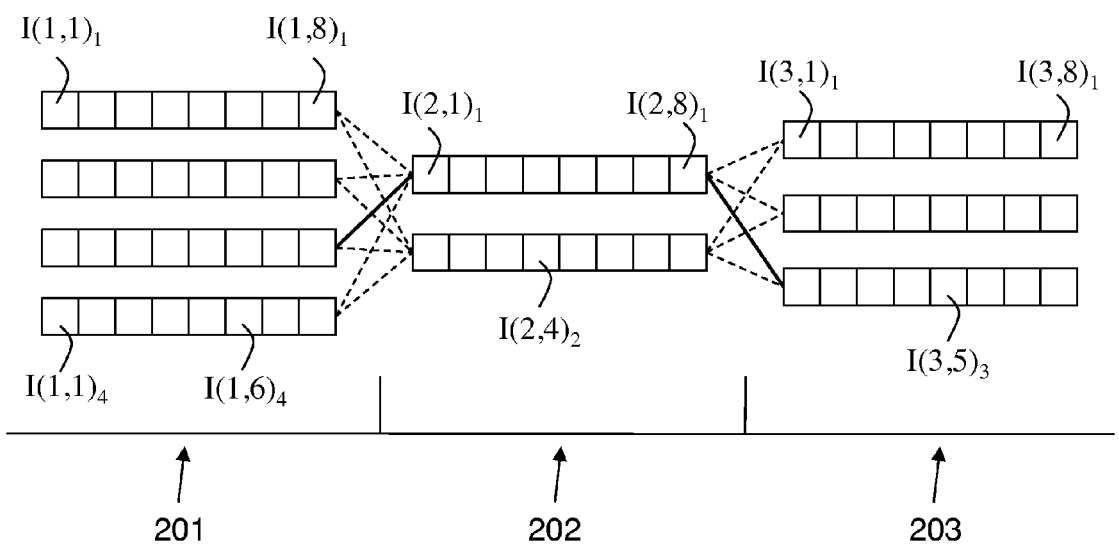
FIG. 2 shows an example of how images at each couch position are combined to form complete datasets.

FIG. 2 shows an example of how images at each couch position can be combined to form complete datasets. Three couch positions, 201, 202, and 203 are shown, with four different images at position 201, two images at position 202, and three images at position 203. All images shown on FIG. 2 are in the same phase or displacement bin. Some of the image slices are labeled according to the above-described notation. The 2D correlation coefficients between all slices at adjacent couch positions were calculated. The set of images selected minimize the inverse correlation coefficients between all slice pairings. In this example, it is assumed that the optimization leads to the selection of image 3 at couch position 201, image 1 at couch position 202, and image 3 at couch position 203. The dashed and solid lines on FIG. 2 connect the slices that are compared to perform the optimization.

The least cost path represents the set of images whose similarity with adjacent images is maximized. Completing this process for all ten image bins yields ten complete sorted image sets (i.e., a 4D CT dataset). The AO procedure takes advantage of the idea that adjacent images have similar features, so by taking these features into account during the sorting process a more spatially coherent image can be obtained. In the setting of variability in breathing depth from cycle to cycle, extremes of motion may not be captured, but rather the most representative cycles over the entire scan are reflected.

A6) Artifact Comparison and Statistical Analysis

The degree of image artifacts is difficult to quantify. However, it is relatively easier for a human observer to determine whether images sorted by one method have a greater degree of artifacts than the same images sorted by another method. Thus we developed an image comparison interface that presents images in pair wise fashion to an observer.

Image artifacts in the 4D CT datasets were evaluated by two expert radiation oncologists (BL and MD). A comparison method was designed to determine the sorting method that yields 4D CT images with fewer artifacts. The observers compared both NN displacement and phase based sorting with their respective AO selection method. We therefore created four complete 4D CT datasets for each patient. Among these, three coronal and two sagittal cross-sections were taken from the same locations in all four datasets. The two datasets (NN and AO) were then displayed side by side and each observer independently scrolled through the phases of both datasets simultaneously (blinded to the selection method of each dataset), and marked the dataset that appeared to have fewer or lesser artifacts. A score of '+1' was given if the AO method was selected, while a score of '−1' was given if the NN method was selected. Additionally, the observers had the option to select neither if the two datasets were comparable (score was '0'). Thus the maximum and minimum score per patient would be +5 and −5, respectively.

The statistical analysis of the data was performed using SAS (version 9.2, Cary, N.C.). Based on the scoring systems described above, an average score for each patient was found by adding the scores of both observers and dividing by ten. A paired t-test was used to determine if the average score per patient would yield zero, which would indicate no difference between the sorting methods. To assess the inter-user agreement between the two observers we used weighted kappa analysis. Briefly, with weighted kappa, perfect agreement gets full credit, partial agreement gets partial credit, and no agreement gets zero credit. Weighted kappa depends on a weighting scheme that determines how much partial credit each partial agreement receives.

B) Results

B1) Artifact Comparison

Figure 3A:
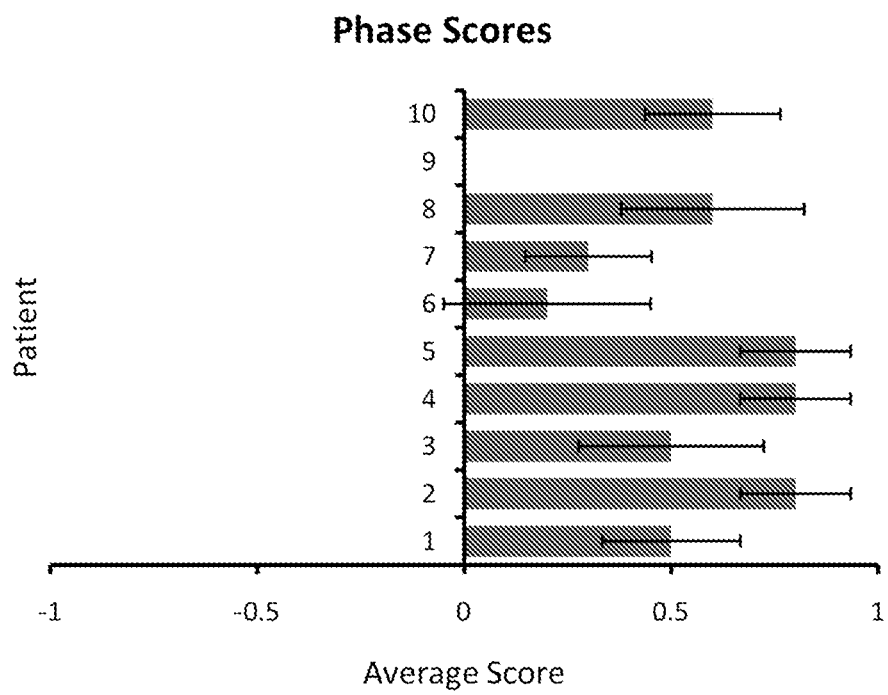
FIG. 3a shows NN and AO scoring results for phase based sorting.
Figure 3B:
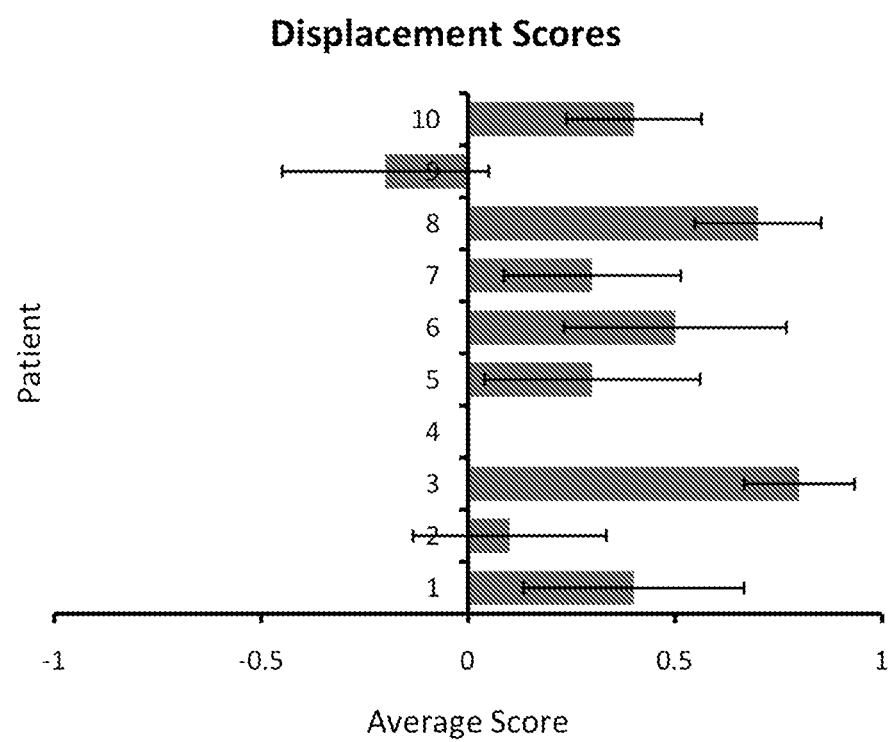
FIG. 3b shows NN and AO scoring results for displacement based sorting.

For phase based sorting the method scored as having fewer artifacts was NN in 4% percent of the cases, AO in 55%, and neither in 41%. A similar result was found for the displacement based sorting method: in 14.4% of the cases the NN method generated cross-sections with fewer artifacts. In 51.1% of the cases the AO method had fewer artifacts, while in 34.4% of the cases the methods were comparable. The score for all ten patients are shown in FIGS. 3a-b. Two radiation oncologists have evaluated 4D CT datasets for ten consecutive patients that have received radiotherapy in our department. FIG. 3a shows the scoring results for the NN phase based sorting and the AO method and FIG. 3b shows the scoring results for the displacement based NN and AO methods.

Figure 4A:
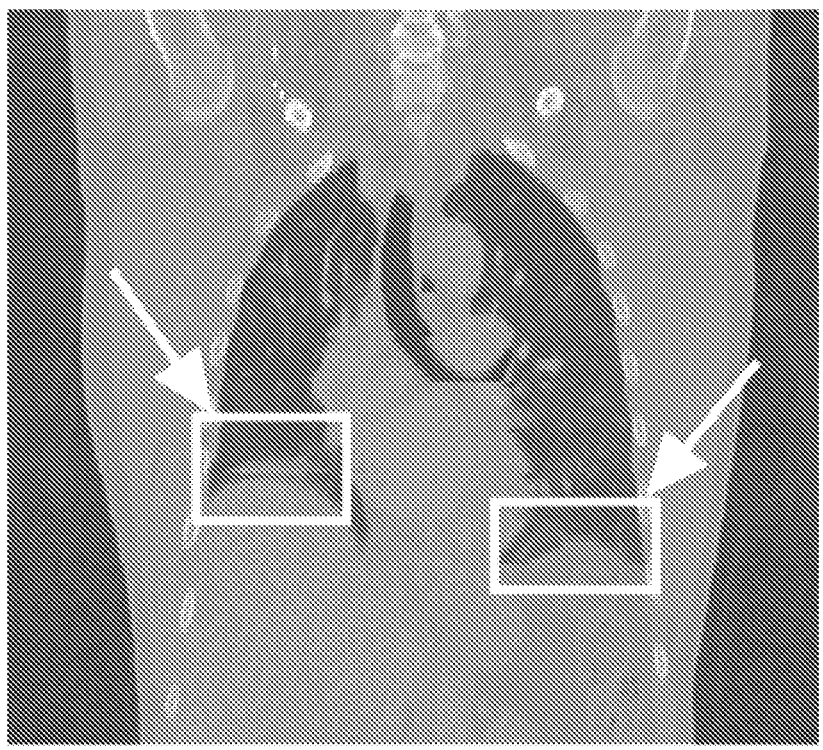
FIG. 4a shows a coronal view of a representative patient sorted with a NN phase based approach.
Figure 4B:
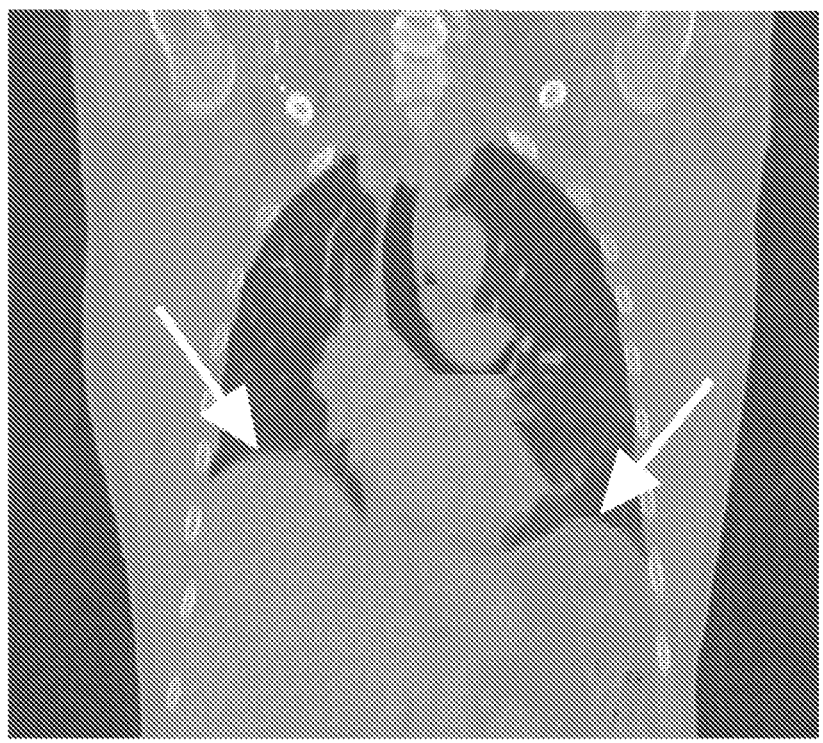
FIG. 4b shows a coronal view of a representative patient sorted with an AO phase based approach.

Additionally, an example of a cross-section taken from two different sorting methods is shown in FIGS. 4a-b. More specifically, FIG. 4a shows a coronal view of a representative patient sorted with a NN phase based approach, and FIG. 4b shows a coronal view of a representative patient sorted with the AO method. Arrows point to the observed artifact in both images.

Overall, AO methods resulted in 4D CT datasets with fewer artifacts (P=0.00022). Of note, the 4D CT datasets from patient 9 appeared identical for every cross-section. This similarity can be expected whenever the number of image options in an image bin is limited to one. This situation occurs more frequently when fewer images (in time) are acquired at each couch position. Also, one patient had a breathing trace where images acquired at several couch positions were only from the exhalation or inhalation portion of the breathing cycle. As a result, the displacement sorting algorithms were unable to create a complete 4D CT dataset. This patient was removed from the displacement comparison portion of the study.

Next we have assessed the inter-observer agreement between the two observers using weighted kappa. The results for both the phase and displacement based sorting methods are summarized in Table I. Shown is the frequency that each observer has chosen a particular method in relation to the other observer. For example, both observers selected the AO sorting method 19 times to be better, while they selected the NN phase based sorting method to be better once. Also, observer 1 (BL) selected one dataset to be better using AO, whereas observer 2 (MD) found that dataset to be better when sorted using NN. The resulting weighted kappa coefficient of all comparisons, which can range from −1 (complete disagreement) to 1 (complete agreement) was 0.3652. The weighted kappa coefficient for the displacement only binning was 0.1595, and the weighted kappa coefficient is 0.2458 for phase binning. While the significance of these scores has been debated in the literature, they nevertheless reflect the human subjectivity in determining the best dataset.

TABLE I

Summary of the selection results for both observers.

| | Phase Sorting Observer 2 (MD) | | | Displacement Sorting Observer 2 (MD) | | |
|---|---|---|---|---|---|---|
| Observer 1 (BL) | NN | Neither | AO | NN | Neither | AO |
| NN | 1 | 0 | 0 | 2 | 0 | 2 |
| Neither | 1 | 12 | 8 | 4 | 5 | 5 |
| AO | 1 | 8 | 19 | 3 | 12 | 12 |

The numbers represents the frequency both observers found a method to generate fewer or lesser artifacts.

B2) Phase and Displacement Distribution

In addition to reviewing the quality of the 4D CT datasets, we also analyzed the distribution of phases and displacement with each image selection procedure. The reason for analyzing this is that an improved 4D CT retrospective sorting method must not only reduce motion artifacts but also accurately portray the correct phase or displacement. For example, a dataset with reduced artifacts is not clinically relevant if the full tumor displacement is not captured entirely or images at a given phase are systematically replaced with images at a different phase in the breathing cycle. Each image has a corresponding phase representing when it was acquired, and the phases of each image for each patient together represent a phase distribution for a selection procedure. Table II shows the phase distributions for the ten patients analyzed.

TABLE II

The distribution of phases and displacements for ten patients.

| | Phase based Sorting | | | | Displacement based Sorting | | | | |
|---|---|---|---|---|---|---|---|---|---|
| | NN | | AO | | | NN | | AO | |
| Phase | Mean | Std. Dev | Mean | Std. Dev | Disp. | Mean | Std. Dev | Mean | Std. Dev |
| 0° | 20.62 | 23.22 | 20.92 | 23.08 | 1 | 0.887 | 0.070 | 0.869 | 0.064 |
| 36° | 39.71 | 18.85 | 40.52 | 19.14 | 0.8 Exh. | 0.789 | 0.053 | 0.776 | 0.058 |
| 72° | 72.86 | 15.78 | 73.09 | 16.37 | 0.6 Exh. | 0.602 | 0.046 | 0.604 | 0.055 |
| 108° | 109.48 | 14.68 | 109.99 | 15.27 | 0.4 Exh. | 0.436 | 0.092 | 0.445 | 0.093 |
| 144° | 143.11 | 14.50 | 143.49 | 15.39 | 0.2 Exh. | 0.357 | 0.141 | 0.361 | 0.138 |
| 180° | 180.97 | 14.28 | 181.77 | 15.31 | 0 | 0.314 | 0.157 | 0.315 | 0.156 |
| 216° | 216.76 | 11.35 | 216.33 | 13.94 | 0.2 Inh. | 0.354 | 0.153 | 0.360 | 0.149 |
| 252° | 251.86 | 11.82 | 251.96 | 14.21 | 0.4 Inh. | 0.442 | 0.088 | 0.450 | 0.090 |
| 288° | 287.96 | 11.96 | 287.87 | 14.30 | 0.6 Inh. | 0.602 | 0.050 | 0.609 | 0.063 |
| 324° | 322.80 | 14.78 | 332.26 | 19.50 | 0.8 Inh. | 0.793 | 0.050 | 0.774 | 0.060 |

Abbreviations: Exh: Exhale, Inh: Inhale, Std. Dev: Standard Deviation

Figure 5A:
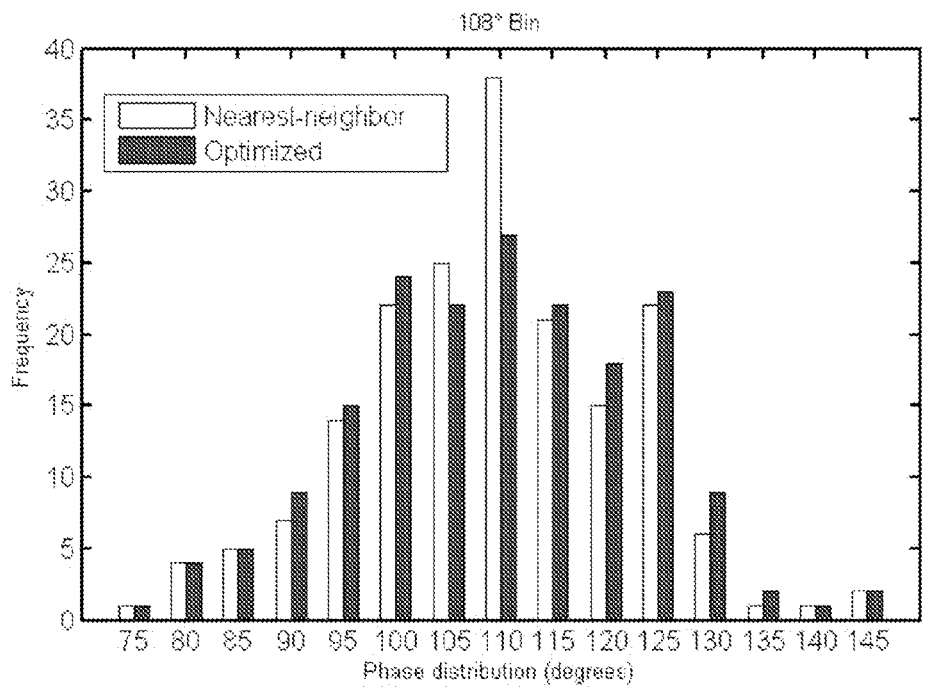
FIG. 5a shows a phase histogram for NN and AO sorting.
Figure 5B:
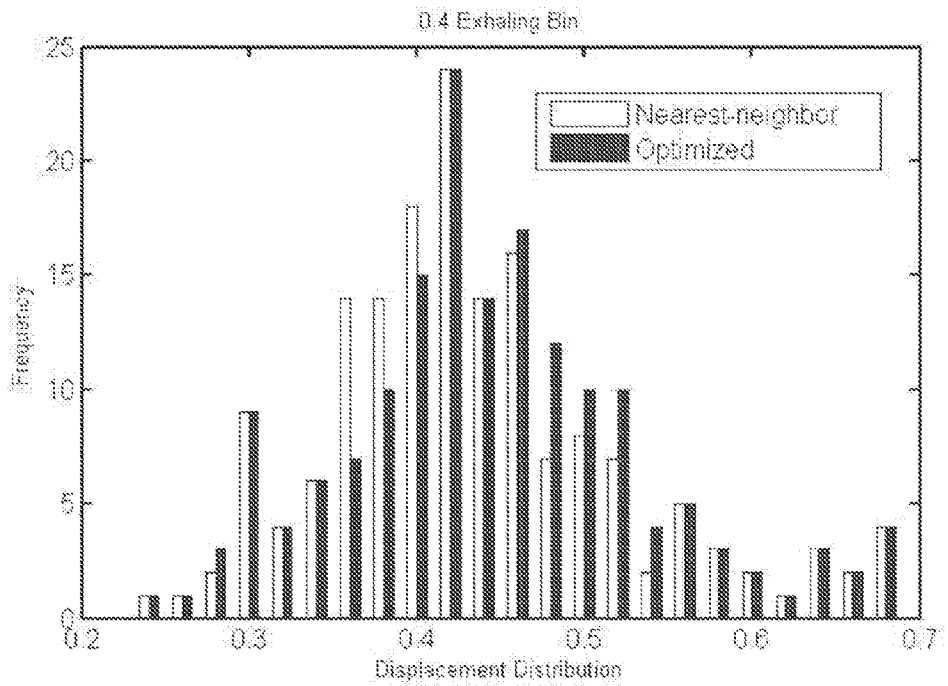
FIG. 5b shows a displacement distribution histogram for NN and AO sorting.

For the majority of phase/displacement bins, the distribution of the means does not change significantly although the spread (i.e., standard deviation) increases. This can be expected since the NN approach always selects images with phase/displacement closer to the desired mean while the AO procedure searches in the bin's vicinity for the best image. The fact that the means do not shift significantly is proof of principle that the slices do accurately represent data from the indicated phase and not a shifted phase. A typical phase and displacement distribution for all 10 patients is shown in FIGS. 5a-b. More specifically, FIG. 5a shows the distribution of phases at the 108° bin, and FIG. 5b shows the distribution of displacements at the 0.4 exhaling bin for the ten patients. The general distribution remains largely identical regardless of the image selection procedure (NN or AO) chosen.

It should be noted that the distribution of the means does not yield any information on whether our method captures the full range of motion of any organ; it solely demonstrates that the 'proper' slices are assigned to each bin. The range of motion is not truncated.

C) Discussion

C1) Improvements with Optimization

Overall, the AO procedure reduced artifacts compared to using solely the NN approach. Our results also showed that the benefits of combining the AO selection method with displacement based sorting were not as pronounced as compared to the AO phase based sorting. The main reason for this is that displacement sorting has been shown to typically generate fewer or less expressed respiratory motion induced artifacts than phase based methods. The displacement sorting methods may have selected the 'best' image initially using the NN approach, and therefore the AO procedure could improve on this initial selection less often. However, displacement binning techniques are used less often clinically than phase based sorting. This may be in part because displacement based sorting often leads to incomplete datasets as seen with patient 4, whose displacement data had to be removed from the study. Additionally, our implementation of displacement sorting results in image bins with fewer initial images to choose from during the selection procedure. This is because maximum inhalation and exhalation are set to the highest and lowest points in the entire breathing trace, so many images acquired near inhalation or exhalation are the only viable option during the selection process.

In this work we have also provided a statistical method that takes the inter-observer variability into account. While it remains to certain degree subjective as to which 4D CT dataset has fewer or lesser artifacts, weighted kappa is suitable to define an agreement between two observers. In our study both observers showed good agreement between their choices.

D) Conclusion

In this work we presented an anatomically based image selection and sorting procedure for 4D CT datasets. Image selection is based on similarity between slices at couch transition and is expressed by the two dimensional correlation coefficient. Our method was examined by two expert thoracic radiation oncologists who found a significant improvement in reducing motion artifact in 4D CT images when using the AO process. We have also demonstrated that our method can be readily implemented in current clinically available retrospective sorting methods.

The invention claimed is:

1. A method of 4D medical imaging, the method comprising:
   a) performing medical imaging to provide a plurality of 3D patient images, wherein the 3D patient images include images taken at two or more patient positions, and wherein the 3D patient images include images taken at two or more different times to cover at least one patient respiration cycle at each of the patient positions;
   b) determining a respiration value for each of the 3D images;
   c) binning the 3D images according to their respiration values into a set of image bins, wherein each image bin is defined by a bin range of respiration values, wherein the bin ranges cover the respiration values without overlapping each other, and wherein at least one image bin includes two or more of the 3D images for at least one of the patient positions;
   d) within each image bin, selecting one 3D image at each patient position according to anatomical similarity between 3D images at adjacent patient positions; and
   e) providing the selected 3D images as a 4D output.

2. The method of claim 1, wherein the respiration value is respiration displacement.

3. The method of claim 1, wherein the respiration value is respiration phase.

4. The method of claim 1, wherein each 3D image includes two or more slices, and wherein comparison of 3D images at adjacent patient positions is performed by comparing the closest slices of the 3D images at adjacent patient positions.

5. The method of claim 4, wherein 3D images at patient position n are indexed with an integer i, wherein 3D images at patient position n+1 are indexed with an integer j, and wherein comparing the closest slices of the 3D images at adjacent patient positions is performed by computing a two dimensional spatial correlation coefficient $K(i,j,n)$ of the closest slices.

6. The method of claim 5, wherein selecting one 3D image at each patient position according to anatomical similarity between 3D images at adjacent patient positions comprises:
   i) computing a pair cost $1/K(i,j,n)$ for each pair of 3D images at adjacent patient positions; and
   ii) selecting the 3D images at each patient position to minimize the total pair cost from an initial patient position to a final patient position.

7. The method of claim 1, wherein binning the 3D images according to their respiration values into a set of image bins comprises:
   i) providing a predetermined set of reference respiration values;
   ii) for each reference respiration value, determining the 3D image that has a respiration value closest to the reference respiration value to thereby determine a nearest neighbor respiration value corresponding to each reference respiration value; and
   iii) averaging adjacent nearest neighbor respiration values to determine boundaries of the image bins.

8. The method of claim 1, wherein the medical imaging is selected from the group consisting of: computed tomography, X-ray imaging, magnetic resonance imaging and positron emission tomography.

* * * * *